US012334081B1

(12) United States Patent
List

(10) Patent No.: US 12,334,081 B1
(45) Date of Patent: Jun. 17, 2025

(54) VOICE CONTROLLED ASSISTANT WITH COAXIAL SPEAKER AND MICROPHONE ARRANGEMENT

(71) Applicant: Amazon Technologies, Inc., Seattle, WA (US)

(72) Inventor: Timothy Theodore List, Santa Cruz, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/666,483

(22) Filed: May 16, 2024

Related U.S. Application Data

(63) Continuation of application No. 18/074,798, filed on Dec. 5, 2022, now Pat. No. 12,014,742, which is a
(Continued)

(51) Int. Cl.
*H04R 27/00* (2006.01)
*G10L 15/08* (2006.01)
(Continued)

(52) U.S. Cl.
CPC .............. *G10L 17/22* (2013.01); *G10L 15/08* (2013.01); *G10L 15/1822* (2013.01);
(Continued)

(58) Field of Classification Search
CPC ..... G10L 17/22; G10L 15/08; G10L 15/1822; G10L 15/30; G10L 21/0208; G10L 15/20; G10L 2021/02082; G10L 2021/02166; H04R 1/08; H04R 1/323; H04R 1/326; H04R 1/345; H04R 3/002; H04R 3/005;
(Continued)

(56) References Cited

U.S. PATENT DOCUMENTS

| 4,574,906 A | 3/1986 | White et al. |
| 6,765,971 B1 | 7/2004 | Qin |

(Continued)

FOREIGN PATENT DOCUMENTS

WO   WO2011088053   7/2011

OTHER PUBLICATIONS

Office action for U.S. Appl. No. 13/486,774, mailed on Sep. 8, 2014, List, "Voice Controlled Assistant with Coaxial Speaker and Microphone Arrangement", 11 pages.
(Continued)

*Primary Examiner* — Brian Ensey
(74) *Attorney, Agent, or Firm* — Pierce Atwood LLP

(57) ABSTRACT

A voice controlled assistant has a housing to hold one or more microphones, one or more speakers, and various computing components. The housing has an elongated cylindrical body extending along a center axis between a base end and a top end. The microphone(s) are mounted in the top end and the speaker(s) are mounted proximal to the base end. The microphone(s) and speaker(s) are coaxially aligned along the center axis. The speaker(s) are oriented to output sound directionally toward the base end and opposite to the microphone(s) in the top end. The sound may then be redirected in a radial outward direction from the center axis at the base end so that the sound is output symmetric to, and equidistance from, the microphone(s).

20 Claims, 5 Drawing Sheets

Related U.S. Application Data continuation of application No. 17/027,155, filed on Sep. 21, 2020, now Pat. No. 11,521,624, which is a continuation of application No. 15/930,967, filed on May 13, 2020, now Pat. No. 11,270,706, which is a continuation of application No. 16/397,931, filed on Apr. 29, 2019, now Pat. No. 10,657,970, which is a continuation of application No. 15/649,256, filed on Jul. 13, 2017, now Pat. No. 10,283,121, which is a continuation of application No. 15/207,249, filed on Jul. 11, 2016, now Pat. No. 9,837,083, which is a continuation of application No. 14/738,669, filed on Jun. 12, 2015, now Pat. No. 9,390,724, which is a continuation of application No. 13/486,774, filed on Jun. 1, 2012, now Pat. No. 9,060,224.

(51) Int. Cl.
| | | |
|---|---|---|
| *G10L 15/18* | (2013.01) | |
| *G10L 15/30* | (2013.01) | |
| *G10L 17/22* | (2013.01) | |
| *G10L 21/0208* | (2013.01) | |
| *H04R 1/08* | (2006.01) | |
| *H04R 1/32* | (2006.01) | |
| *H04R 1/34* | (2006.01) | |
| *H04R 3/00* | (2006.01) | |
| *G10L 15/20* | (2006.01) | |
| *G10L 21/0216* | (2013.01) | |
| *H04R 3/12* | (2006.01) | |

(52) U.S. Cl.
CPC .......... *G10L 15/30* (2013.01); *G10L 21/0208* (2013.01); *H04R 1/08* (2013.01); *H04R 1/323* (2013.01); *H04R 1/326* (2013.01); *H04R 1/345* (2013.01); *H04R 3/002* (2013.01); *H04R 3/005* (2013.01); *G10L 15/20* (2013.01); *G10L 2021/02082* (2013.01); *G10L 2021/02166* (2013.01); *H04R 3/12* (2013.01); *H04R 27/00* (2013.01); *H04R 2227/003* (2013.01); *H04R 2420/07* (2013.01)

(58) Field of Classification Search
CPC .... H04R 3/12; H04R 27/00; H04R 2227/003; H04R 2420/07
See application file for complete search history.

(56) References Cited

U.S. PATENT DOCUMENTS

| | | | |
|---|---|---|---|
| 6,826,533 B2 * | 11/2004 | Burchard | ............... G10L 15/22 704/E15.044 |
| 7,227,566 B2 | 6/2007 | Abe et al. | |
| 7,277,566 B2 | 10/2007 | Miyawaki et al. | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 7,925,004 B2 | 4/2011 | Hodges et al. | |
| 8,385,557 B2 | 2/2013 | Tashev et al. | |
| 9,060,224 B1 | 6/2015 | List | |
| 9,318,108 B2 | 4/2016 | Gruber et al. | |
| 2005/0207591 A1 | 9/2005 | Tsuji et al. | |
| 2007/0263845 A1 | 11/2007 | Hodges et al. | |
| 2012/0016678 A1* | 1/2012 | Gruber | ............... G06F 16/3329 704/E21.001 |
| 2012/0223885 A1 | 9/2012 | Perez | |
| 2015/0279387 A1 | 10/2015 | List | |
| 2018/0336892 A1 | 11/2018 | Kim et al. | |

OTHER PUBLICATIONS

Non Final Office Action dated Sep. 19, 2019 for U.S. Appl. No. 16/397,931 "Voice Controlled Assistant With Coaxial Speaker and Microphone Arrangement" List, 10 pages.

Office Action for U.S. Appl. No. 15/649,256, mailed on Oct. 17, 2018, List, "Voice Controlled Assistant With Coaxial Speaker and Microphone Arrangement", 11 pages.

Office Action for U.S. Appl. No. 15/207,249, mailed on Feb. 1, 2017, List, "Voice Controlled Assistant With Coaxial Speaker and Microphone Arrangement", 15 pages.

Office action for U.S. Appl. No. 14/738,669, mailed on Feb. 11, 2016, List, "Voice Controlled Assistant with Coaxial Speaker and Microphone Arrangement ", 6 pages.

Office action for U.S. Appl. No. 15/649,256, mailed on Mar. 22, 2018, List, "Voice Controlled Assistant With Coaxial Speaker and Microphone Arrangement", 6 pages.

Office Action for U.S. Appl. 17/027,155, mailed Apr. 13, 2022, List, "Voice Controlled Assistant With Coaxial Speaker and Microphone Arrangement", 12 pages.

Office action for U.S. Appl. No. 14/738,669, mailed on Sep. 24, 2015, List, "Voice Controlled Assistant with Coaxial Speaker and Microphone Arrangement", 9 pages.

Office action for U.S. Appl. No. 15/207,249, mailed on Sep. 28, 2016, List, "Voice Controlled Assistant With Coaxial Speaker and Microphone Arrangement", 13 pages.

Pinhanez, "The Everywhere Displays Projector: A Device to Create Ubiquitous Graphical Interfaces", IBM Thomas Watson Research Center, Ubicomp 2001, 18 pages.

* cited by examiner

VOICE CONTROLLED ASSISTANT WITH COAXIAL SPEAKER AND MICROPHONE ARRANGEMENT

CROSS-REFERENCE TO RELATED APPLICATIONS

This application is a continuation of, and claims priority to, U.S. patent application Ser. No. 18/074,798, filed on Dec. 5, 2022, entitled "Voice Controlled Assistant With Coaxial Speaker and Microphone Arrangement", which is a continuation of, and claims priority to, U.S. patent application Ser. No. 17/027,155, filed on Sep. 21, 2020, entitled "Voice Controlled Assistant With Coaxial Speaker and Microphone Arrangement", which will issue as U.S. Pat. No. 11,521,624 on Dec. 6, 2022, which is a continuation of, and claims priority to, U.S. patent application Ser. No. 15/930,967, filed on May 13, 2020, entitled "Voice Controlled Assistant With Coaxial Speaker and Microphone Arrangement", now known as U.S. Pat. No. 11,270,706, which issued on Mar. 8, 2022, which is a continuation of U.S. patent application Ser. No. 16/397,931, filed on Apr. 29, 2019, entitled "Voice Controlled Assistant With Coaxial Speaker and Microphone Arrangement", now U.S. Pat. No. 10,657,970, which issued on May 19, 2020, which is a continuation of U.S. patent application Ser. No. 15/649,256, filed on Jul. 13, 2017, entitled "Voice Controlled Assistant With Coaxial Speaker and Microphone Arrangement", now U.S. Pat. No. 10,283,121, which issued on May 7, 2019, which is a continuation of U.S. patent application Ser. No. 15/207,249, filed on Jul. 11, 2016, entitled "Voice Controlled Assistant With Coaxial Speaker and Microphone Arrangement", now U.S. Pat. No. 9,837,083, which issued on Dec. 5, 2017, which is a continuation of U.S. patent application Ser. No. 14/738,669, filed on Jun. 12, 2015, entitled "Voice Controlled Assistant with Coaxial Speaker and Microphone Arrangement", now U.S. Pat. No. 9,390,724, which issued on Jul. 12, 2016, which is a continuation of U.S. patent application Ser. No. 13/486,774, filed on Jun. 1, 2012, entitled "Voice Controlled Assistant with Coaxial Speaker and Microphone Arrangement", now U.S. Pat. No. 9,060,224, which issued on Jun. 16, 2015, all of which are expressly incorporated herein by reference in their entirety.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through speech.

When using speech as an input, the device is commonly equipped with microphones to receive voice input and a speech recognition component that attempts to recognize the voice input. This voice input often competes with other audible sounds that might be received by the microphones, such as background voices, ambient noise, and perhaps even double talk. Double talk refers to a situation where sound from the near end talker reaches the microphones simultaneously with sound from the far end talker that is played out through the device loudspeakers. That is, sound played out of the loudspeaker (e.g., sound corresponding to signals received from the far end talker) echoes and reaches the microphones, along with sound from the near end talker.

These additional sounds concurrent with the speech input can negatively impact acoustic performance of the device, including both input and output of audio. Accordingly, there is a need for improved architectures of voice enabled devices that enhance acoustic performance.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

A voice controlled assistant having a coaxially aligned speaker and microphone arrangement is described. The voice controlled assistant is described in the context of an architecture in which the assistant is connected to far end talkers or a network accessible computing platform, or "cloud service", via a network. The voice controlled assistant may be implemented as a hands-free device equipped with a wireless LAN (WLAN) interface. The voice controlled assistant relies primarily, if not exclusively, on voice interactions with a user.

The voice controlled assistant may be positioned in a room (e.g., at home, work, store, etc.) to receive user input in the form of voice interactions, such as spoken requests or a conversational dialogue. Depending on the request, the voice controlled assistant may perform any number of actions. For instance, the assistant may play music or emit verbal answers to the user. The assistant may alternatively function as a communication device to facilitate network voice communications with a far end talker. As still another alternative, the user may ask a question or submit a search request to be performed by a remote cloud service. For instance, the user's voice input may be transmitted from the assistant over a network to the cloud service, where the voice input is interpreted and used to perform a function. In the event that the function creates a response, the cloud service transmits the response back over the network to the assistant, where it may be audibly emitted.

Some of the techniques described herein may be implemented in other electronic devices besides a voice controlled assistant 104. For instance, aspects may be implemented in communications devices, tablet or computing devices, or any number of electronic devices that is capable of producing sound from one or more speakers and receiving sound in one or more microphones.

The architecture may be implemented in many ways. Various example implementations are provided below. However, the architecture may be implemented in many other contexts and situations different from those shown and described below.

Illustrative Environment and Device

Figure 1:
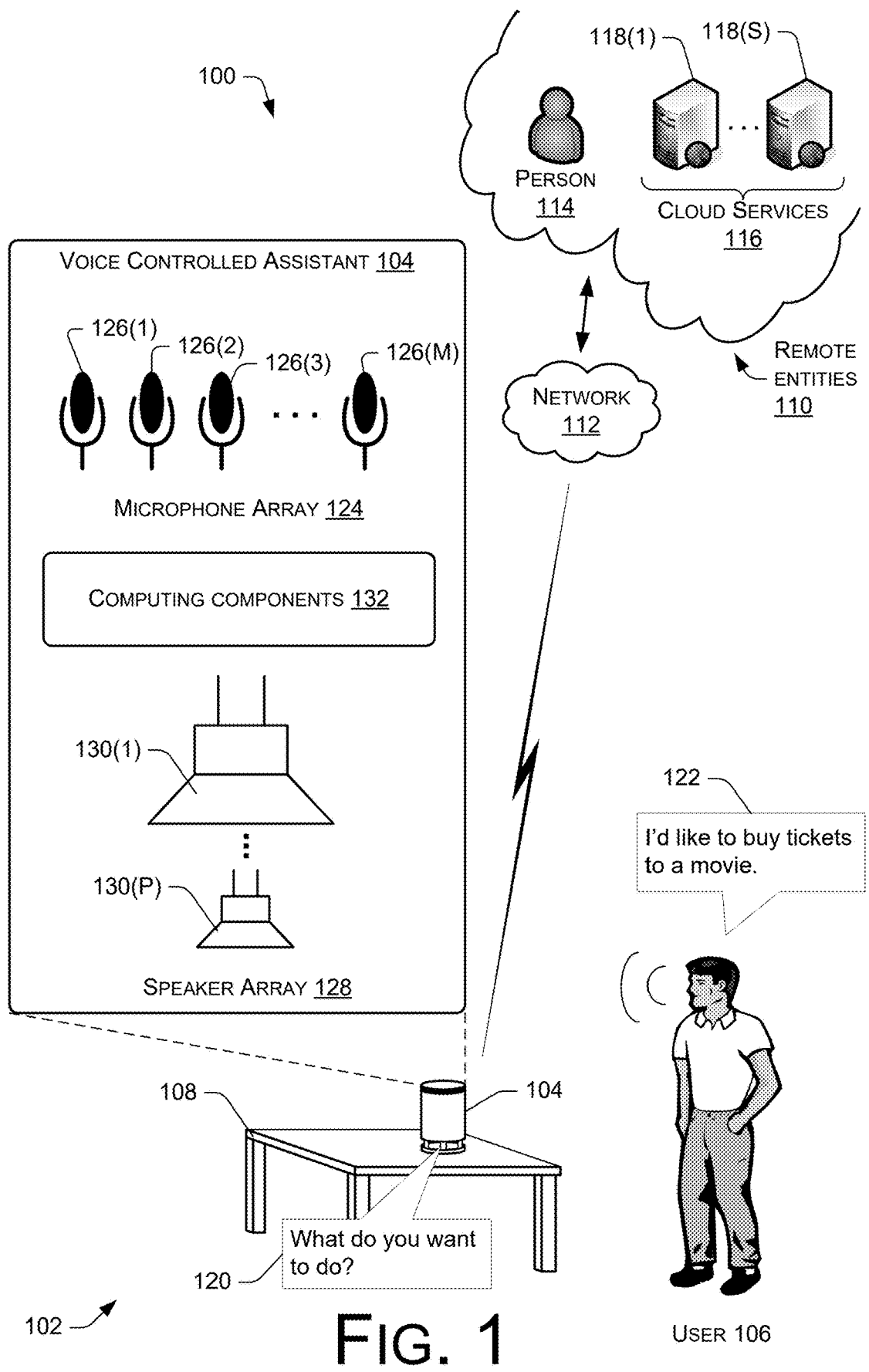
FIG. 1 shows an illustrative voice interactive computing architecture set in an example environment that includes a near end talker communicating with a far end talker or cloud service through use of a voice controlled assistant.

FIG. 1 shows an illustrative architecture 100, set in an exemplary environment 102, which includes a voice controlled assistant 104 and a user 106 of the voice controlled assistant 104. Although only one user 106 is illustrated in FIG. 1, multiple users may use the voice controlled assistant 104. The user 106 may be located proximal to the voice controlled assistant 104, and hence serve as a near end talker in some contexts.

In this illustration, the voice controlled assistant 104 is physically positioned on a table 108 within the environment 102. The voice controlled assistant 104 is shown sitting upright and supported on its base end. In other implementations, the assistant 104 may be placed in any number of locations (e.g., ceiling, wall, in a lamp, beneath a table, on a work desk, in a hall, under a chair, etc.). The voice controlled assistant 104 is shown communicatively coupled to remote entities 110 over a network 112. The remote entities 110 may include individual people, such as person 114, or automated systems (not shown) that serve as far end talkers to verbally interact with the user 106. The remote entities 110 may alternatively comprise cloud services 116 hosted, for example, on one or more servers 118(1), . . . , 118(S). These servers 118(1)-(S) may be arranged in any number of ways, such as server farms, stacks, and the like that are commonly used in data centers.

The cloud services 116 generally refer to a network accessible platform implemented as a computing infrastructure of processors, storage, software, data access, and so forth that is maintained and accessible via a network such as the Internet. Cloud services 116 do not require end-user knowledge of the physical location and configuration of the system that delivers the services. Common expressions associated with cloud services include "on-demand computing", "software as a service (SaaS)", "platform computing", "network accessible platform", and so forth.

The cloud services 116 may host any number of applications that can process the user input received from the voice controlled assistant 104, and produce a suitable response. Example applications might include web browsing, online shopping, banking, email, work tools, productivity, entertainment, educational, and so forth.

In FIG. 1, the user 106 is shown communicating with the remote entities 110 via the voice controlled assistant 104. The assistant 104 outputs an audible questions, "What do you want to do?" as represented by dialog bubble 120. This output may represent a question from a far end talker 114, or from a cloud service 116 (e.g., an entertainment service). The user 106 is shown replying to the question by stating, "I'd like to buy tickets to a movie" as represented by the dialog bubble 122.

The voice controlled assistant 104 is equipped with an array 124 of microphones 126(1), . . . , 126(M) to receive the voice input from the user 106 as well as any other audio sounds in the environment 102. The microphones 126(1)-(M) are generally arranged at a first or top end of the assistant 104 opposite the base end seated on the table 108, as will be described in more detail with reference to FIGS. 3 and 4. Although multiple microphones are illustrated, in some implementations, the assistant 104 may be embodied with only one microphone.

The voice controlled assistant 104 may further include a speaker array 128 of speakers 130(1), . . . , 130(P) to output sounds in humanly perceptible frequency ranges. The speakers 130(1)-(P) may be configured to emit sounds at various frequency ranges, so that each speaker has a different range. In this manner, the assistant 104 may output high frequency signals, mid frequency signals, and low frequency signals. The speakers 130(1)-(P) are generally arranged at a second or base end of the assistant 104 and oriented to emit the sound in a downward direction toward the base end and opposite to the microphone array 124 in the top end. One particular arrangement is described below in more detail with reference to FIG. 3. Although multiple speakers are illustrated, in some implementations, the assistant 104 may be embodied with only one speaker.

The voice controlled assistant 104 may further include computing components 132 that process the voice input received by the microphone array 124, enable communication with the remote entities 110 over the network 112, and generate the audio to be output by the speaker array 128. The computing components 132 are generally positioned between the microphone array 123 and the speaker array 128, although essentially any other arrangement may be used. One collection of computing components 132 are illustrated and described with reference to FIG. 2.

Illustrative Voice Controlled Assistant

Figure 2:
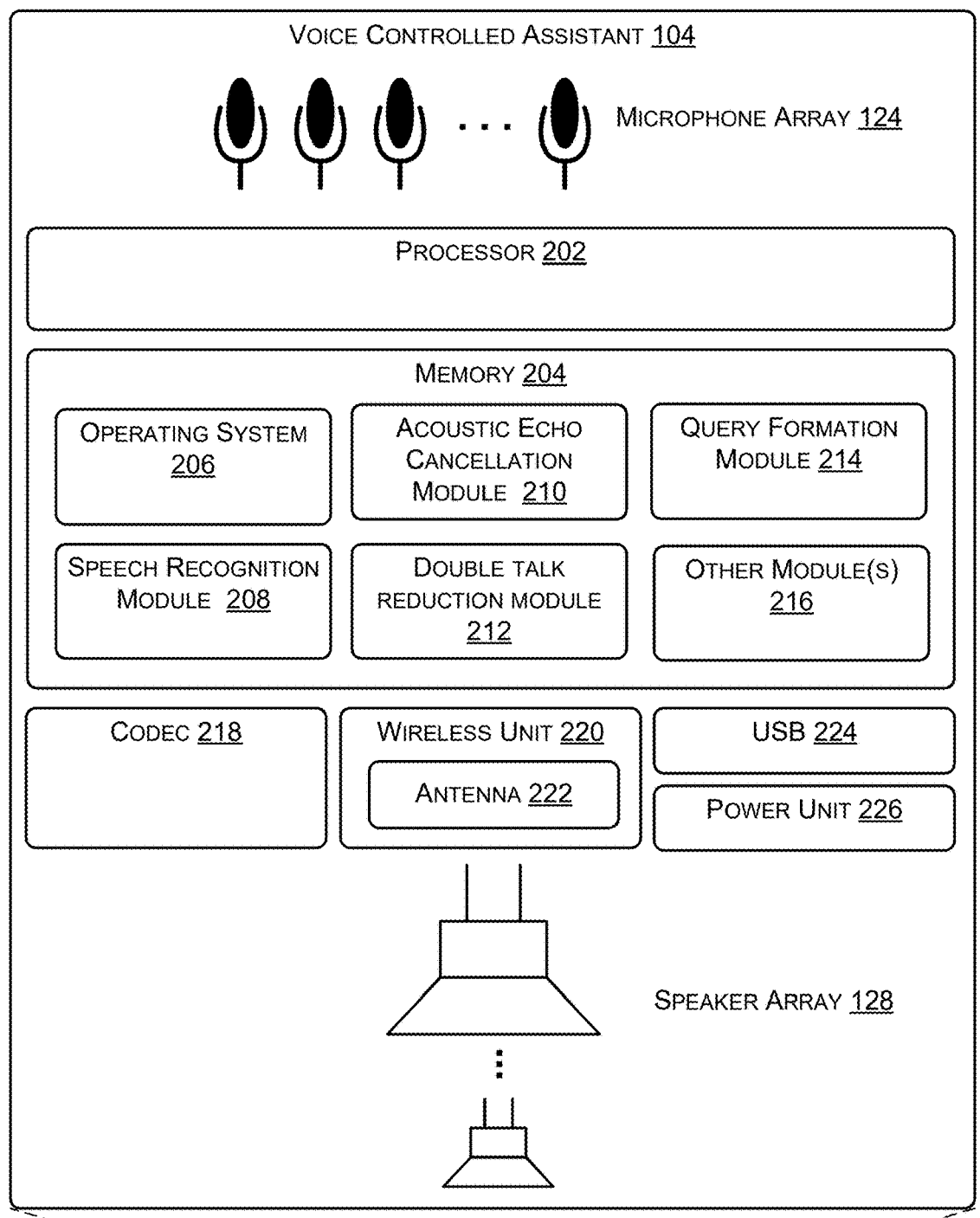
FIG. 2 shows a block diagram of selected functional components implemented in the voice controlled assistant of FIG. 1.

FIG. 2 shows selected functional components of the voice controlled assistant 104 in more detail. Generally, the voice controlled assistant 104 may be implemented as a standalone device that is relatively simple in terms of functional capabilities with limited input/output components, memory and processing capabilities. For instance, the voice controlled assistant 104 may not have a keyboard, keypad, or other form of mechanical input. Nor does it have a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the voice controlled assistant 104 includes the microphone array 124, a speaker array 128, a processor 202, and memory 204. The microphone array 124 may be used to capture speech input from the user 106, or other sounds in the environment 102. The speaker array 128 may be used to output speech from a far end talker, audible responses provided by the cloud services, forms of entertainment (e.g., music, audible books, etc.), or any other form of sound. The speaker array 128 may output a wide range of audio frequencies including both human perceptible frequencies and non-human perceptible frequencies.

The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the assistant 104 for the benefit of other modules. Several other modules may be provided to process verbal input from the user 106. For instance, a speech recognition module 208 provides some level of speech recognition functionality. In some implementations, this functionality may be limited to specific commands that perform fundamental tasks like waking up the device, configuring the device, and the like. The amount of speech recognition capabilities implemented on the assistant 104 is an implementation detail, but the architecture described herein can support having some speech recognition at the local assistant 104 together with more expansive speech recognition at the cloud services 116.

An acoustic echo cancellation module 210 and a double talk reduction module 212 are provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker. By isolating on the near talker, better signal quality is provided to the speech recognition module 208 to enable more accurate interpretation of the speech utterances.

A query formation module 214 may also be provided to receive the parsed speech content output by the speech recognition module 208 and to form a search query or some form of request. This query formation module 214 may utilize natural language processing (NLP) tools as well as various language modules to enable accurate construction of queries based on the user's speech input.

The modules shown stored in the memory 204 are merely representative. Other modules 216 for processing the user voice input, interpreting that input, and/or performing functions based on that input may be provided.

The voice controlled assistant 104 might further include a codec 218 coupled to the microphones of the microphone array 124 and the speakers of the speaker array 128 to encode and/or decode the audio signals. The codec 218 may convert audio data between analog and digital formats. A user may interact with the assistant 104 by speaking to it, and the microphone array 124 captures the user speech. The codec 218 encodes the user speech and transfers that audio data to other components. The assistant 104 can communicate back to the user by emitting audible statements passed through the codec 218 and output through the speaker array 128. In this manner, the user interacts with the voice controlled assistant simply through speech, without use of a keyboard or display common to other types of devices.

The voice controlled assistant 104 includes a wireless unit 220 coupled to an antenna 222 to facilitate a wireless connection to a network. The wireless unit 220 may implement one or more of various wireless technologies, such as wifi, Bluetooth, RF, and so on.

A USB port 224 may further be provided as part of the assistant 104 to facilitate a wired connection to a network, or a plug-in network device that communicates with other wireless networks. In addition to the USB port 224, or as an alternative thereto, other forms of wired connections may be employed, such as a broadband connection. A power unit 226 is further provided to distribute power to the various components on the assistant 104.

The voice controlled assistant 104 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice controlled assistant 104 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 104 does not use or need to use any input devices or displays.

Accordingly, the assistant 104 may be implemented as an aesthetically appealing device with smooth and rounded surfaces, with some apertures for passage of sound waves, and merely having a power cord and optionally a wired interface (e.g., broadband, USB, etc.). In the illustrated implementation, the assistant 104 has a housing of an elongated cylindrical shape. Apertures or slots are formed in a base end to allow emission of sound waves. A more detailed discussion of one particular structure is provided below with reference to FIG. 3. Once plugged in, the device may automatically self-configure, or with slight aid of the user, and be ready to use. As a result, the assistant 104 may be generally produced at a low cost. In other implementations, other I/O components may be added to this basic model, such as specialty buttons, a keypad, display, and the like.

Figure 3:
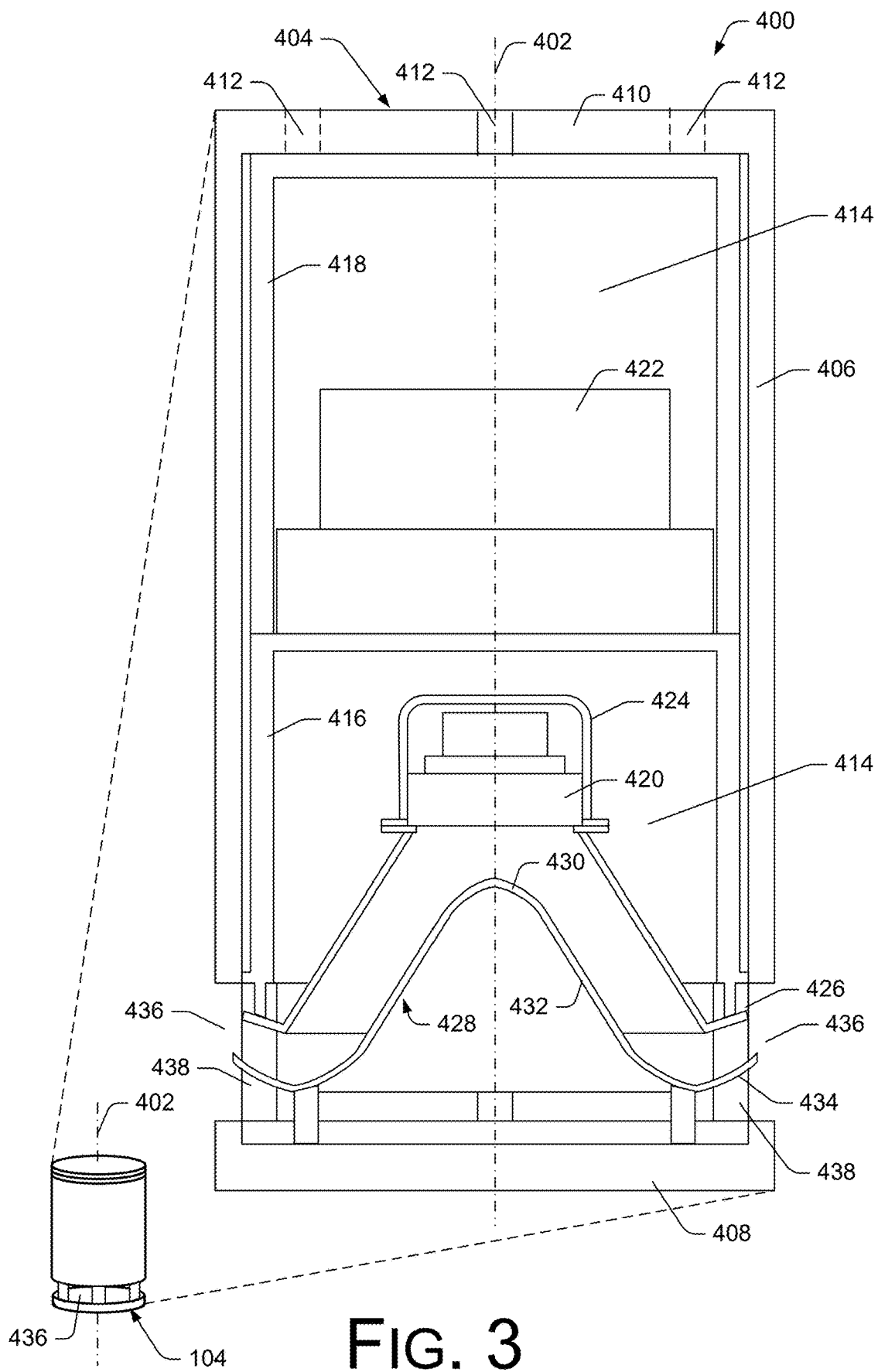
FIG. 3 is a cross sectional view of the voice controlled assistant of FIG. 1 according to one example implementation in which the speakers and microphone array are coaxially aligned.

FIG. 3 is a cross sectional view 400 of the voice controlled assistant 104 taken along a plane that intersects a center axis 402 and passes through a diameter of the cylindrical-shaped housing. The assistant 104 has a housing 404 with an elongated, cylindrical-shaped middle section 406 extending between a first or base end 408 and a second or top end 410. The cylindrical-shaped middle section 406 has a smooth outer surface and due to the rounded shape, the two ends 408 and 410 are circular in shape. The base end 408 is designed to rest on a surface, such as a table 108 in FIG. 1, to support the housing 404. In this position, the top end 410 is distal and upward relative to the base end 408.

One or more microphones 126 are mounted proximal to the top end 410 of the housing 404 to capture audio input, such as voice input from the user. Multiple orifices 412 are formed in the top end 410 to hold the microphones. There are many possible arrangements of the microphones in the microphone array.

Figure 4:
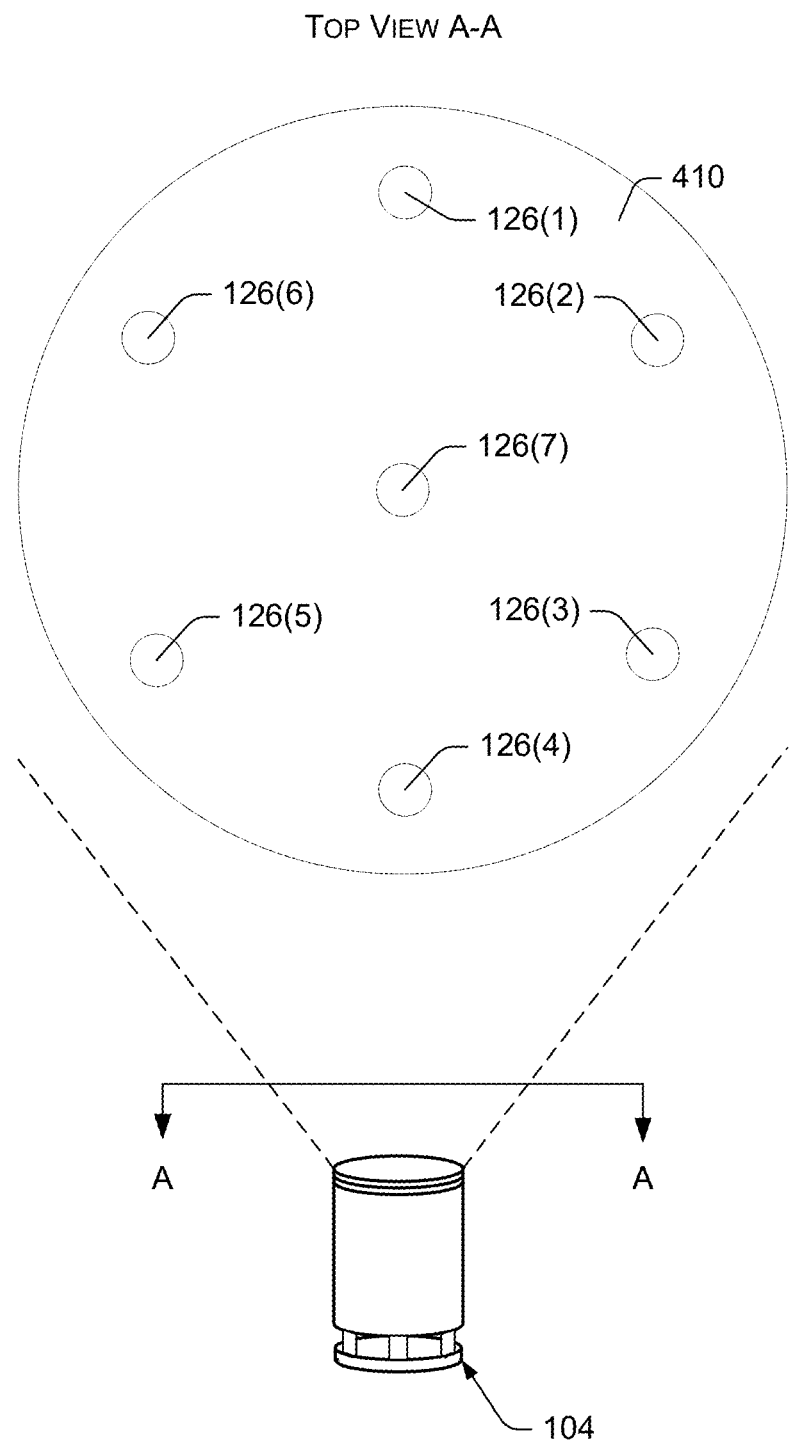
FIG. 4 shows a top down view of the voice controlled assistant of FIG. 1 to illustrate one example arrangement of microphones in the microphone array.

FIG. 4 shows one example arrangement of microphones in the top end 410. More particularly, FIG. 4 shows a top down view of the voice controlled assistant 104 taken along line A-A to illustrate the top end 410 of the housing 404. In this example, the microphone array has seven microphones 126(1), . . . , 126(7). Six of the microphones 126(1)-(6) are placed along a circle concentric to the perimeter of the top end 410. A seventh microphone 126(7) is positioned at the center point of the circular top end 410. It is noted that this is merely one example. Arrays with more or less than seven microphones may be used, and other layouts are possible.

With reference again to FIG. 3, the housing 404 defines a hollow chamber 414 therein. Within this chamber 414 are two skeletal members: a first or lower skeletal member 416 that provides structural support for components in the lower half of the chamber 414 and a second or upper skeletal member 418 that provides structural support for components in the upper half of the chamber 414.

The computing components 132 are mounted in the upper skeletal member 418, but are not shown in FIG. 3 to better illustrate the structural arrangement of the speakers and microphones. The computing components 132 may include any number of processing and memory capabilities, as well as power, codecs, network interfaces, and so forth. Example components are shown in FIG. 2.

Two speakers are shown mounted in the housing 404. A first speaker 420 is shown mounted within the lower skeletal member 416. The first speaker 420 outputs a first range of frequencies of audio sound. In one implementation, the first speaker 420 is a mid-high frequency speaker that plays the middle to high frequency ranges in the human-perceptible audible range. A second speaker 422 is shown mounted within the upper skeletal member 416 elevationally above the first speaker 420. In this implementation, the second speaker 422 is a low frequency speaker that plays the low frequency ranges in the human-perceptible audible range. The mid-high frequency speaker 420 is smaller than the low frequency speaker 422.

The two speakers 420 and 422 are mounted in a coaxial arrangement along the center axis 402, with the low frequency speaker 422 atop the mid-high frequency speaker 420. The speakers are also coaxial along the center axis 402 to the microphone array, or more particularly, to the plane intersecting the microphone array. The middle microphone 126(7) is positioned at the center point and lies along the center axis 402. Further, the two speakers 420 and 422 are oriented to output sound in a downward direction toward the base end 408 and away from the microphones 126 mounted in the top end 410. The low frequency speaker 422 outputs sound waves that pass through one or more openings in the lower skeletal member 416. The low frequency waves may emanate from the housing in any number of directions. Said another way, in some implementations, the low frequency speaker 422 may function as a woofer to generate low frequency sound waves that flow omni-directionally from the assistant 104.

The mid-high frequency speaker 420 is mounted within a protective shielding 424, which provides a shield to the sound waves emitted from the low frequency speaker 422. Small openings or slots 426 are formed in middle section 406 of the housing 404 near the base end 402 to pass sound waves from the chamber 414, but the low frequency waves need not be constrained to these slots.

The mid-high frequency speaker 420 emits mid-high frequency sound waves in a downward direction onto a sound distribution cone 428 mounted to the base end 408. The sound distribution cone 428 is coaxially arranged in the housing 404 along the center axis 402 and adjacent to the mid-high frequency speaker 420. The sound distribution cone 428 has a conical shape with a smooth upper nose portion 430, a middle portion 432 with increasing radii from top to bottom, and a lower flange portion 434 with smooth U-shaped flange. The sound distribution cone 428 directs the mid-high frequency sound waves from the mid-high frequency speaker 420 along the smooth conical surface downward along the middle portion 432 and in a radial outward direction from the center axis 402 along the lower flange portion 434 at the base end 408 of the housing 404. The radial outward direction is substantially perpendicular to the initial downward direction of the sound along the center axis 402. In this manner, the sound distribution cone 428 essentially delivers the sound out of the base end 408 of the housing 404 symmetrical to, and equidistance from, the microphone array 124 in the top end 410 of the housing. The sound distribution cone 428 may also have the affect of amplifying the sound emitted from the mid-high frequency speaker 420.

The housing 404 has openings or slots 436 formed adjacent to the base end 408. These slots 436 permit passage of the sound waves, and particularly the high frequency sound waves, emitted from the mid-high frequency speaker 420. The slots 436 are comparatively smaller than the size or diameters of the speakers 420 and 422. However, the sound is still efficiently directed out through the slots 436 by the sound distribution cone 428. Structural posts 438 provide structural stability between the based end 408 and the middle section 406 of the housing 404.

Illustrative Operation

Figure 5:
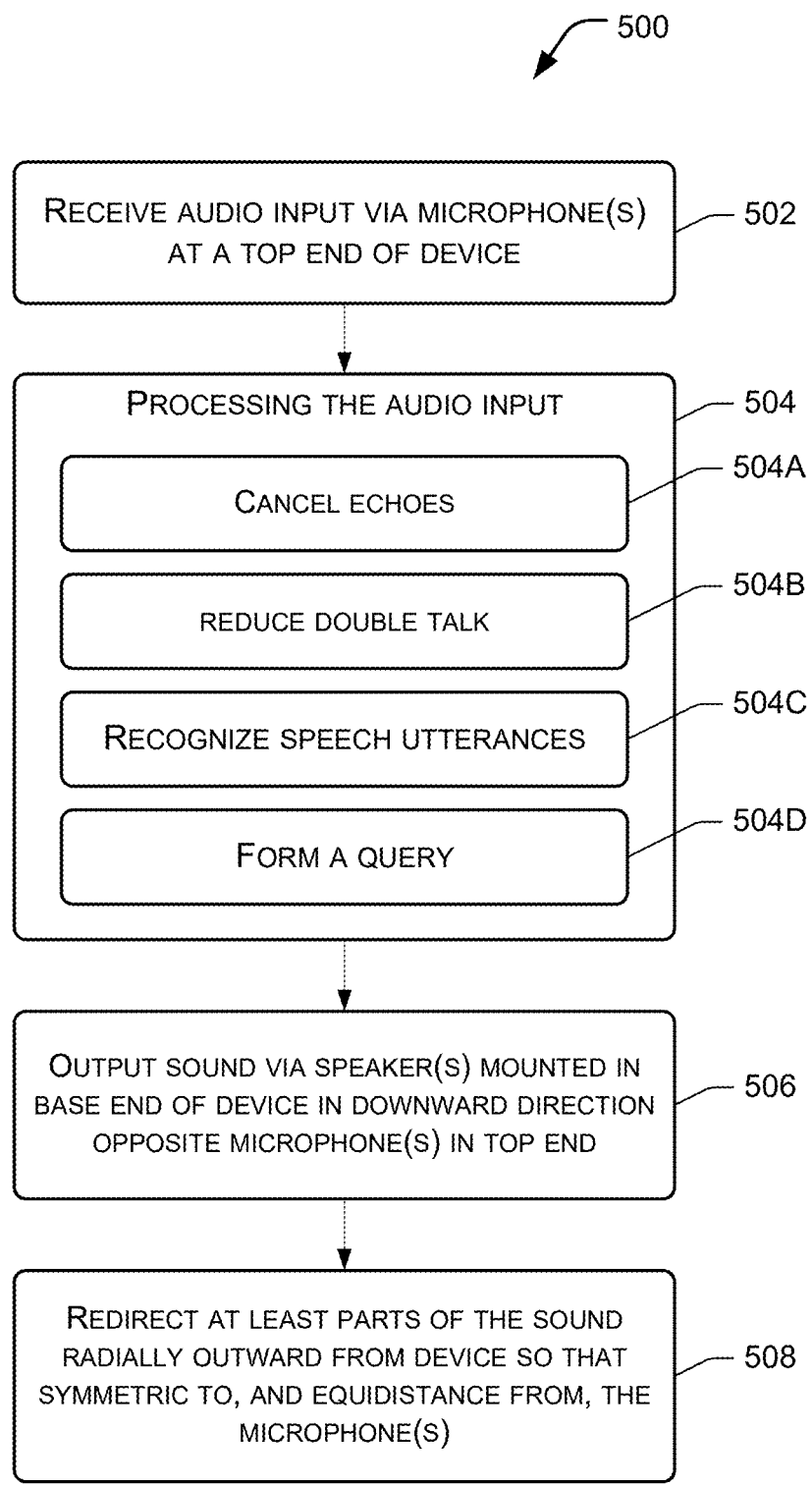
FIG. 5 is a flow diagram showing an illustrative process of operating the voice controlled assistant of FIG. 1.

FIG. 5 is a flow diagram of an illustrative process 500 to operate a communication device. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For purposes of discussion, the process 500 is described with reference to the voice controlled assistant 104. However, the process may be performed by other electronic devices.

At 502, audio input is received by the one or more microphones 126(1)-(M) of the microphone array 124 at the top end 410 of the housing 404. The audio input may be speech of the near end talker, other voices in the environment, sounds from other electronics (e.g., TVs, radios, etc.), ambient noise, and so forth.

At 504, the audio input is processed. Depending upon the implementation and environment, various computing components 132 are used to process the audio input. As examples, the AEC module 210 may detect and cancel echoes in the input signal at 504A. The double talk reduction module 212 may determine the likelihood of double talk and seek to reduce or eliminate that component in the input signal at 504B. In some implementations, the filtered audio input is then transmitted to the far end talker. In other implementations, however, additional processing may be performed. For instance, once these and other non-primary components are removed from the audio input, the speech recognition module 208 can parse the resulting data in an effort to recognize the primary speech utterances from the near end talker at 504C. From this recognized speech, the query formation module 214 may form a query or request at 504D. This query or request may then be transmitted to a cloud service 116 for further processing and generation of a response and/or execution of a function.

At 506, any sound is output by the one or more speakers 130(1)-(P) mounted in the base end 408 of the housing 404. When the assistant 104 is resting on the base end 408, the sound is output in a downward direction opposite to the microphones 126(1)-(M) in the top end 410.

At 508, at least parts of the sound, particularly the mid-high frequency ranges, are redirected from the initial downward path outward in a radial direction from the base end 408 of the assistant 104. These parts of the sound are output symmetrical to, and equidistance from, the microphone array 124 in the top end 410 of the housing 404.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A device, comprising:
a housing;
a microphone;
a network interface configured to communicate over a network;
one or more processors; and
non-transitory computer-readable media storing instructions that, when executed by the one or more processors, cause the device to perform operations comprising:
receiving audio at the microphone;
generating first audio data representing a processed instance of an audio signal corresponding to the audio;
generating second audio data as a result of digital signal processing performed on the first audio data;
causing a first speech recognition component to determine if the second audio data represents a first wake word;
causing a second speech recognition component to determine if the second audio data represents a second wake word, the first speech recognition component differing from the second speech recognition component; and
sending the second audio data to a remote speech processing system based at least in part on the first speech recognition component determining that the second audio data represents the first wake word.

2. The device of claim 1, wherein generating the second audio data includes performing microphone calibration on the first audio data.

3. The device of claim 1, wherein generating the second audio data includes performing beamforming on the first audio data.

4. The device of claim 2, wherein the non-transitory computer-readable media is further configured with instructions that, when executed by the one or more processors, cause the device to perform operations comprising performing acoustic echo cancellation on the second audio data.

5. The device of claim 1, wherein:
generating the second audio data includes:
generating first processed audio data utilizing a first digital signal processing component associated with the first speech recognition component; and
generating second processed audio data utilizing a second digital signal processing component associated with the second speech recognition component;
the first speech recognition component utilizes the first processed audio data to identify the first wake word; and
the second speech recognition component utilizes the second processed audio data to identify the second wake word.

6. The device of claim 5, wherein the first digital signal processing component performs beamforming on the first audio data to generate the second audio data.

7. The device of claim 5, wherein the first digital signal processing component performs acoustic echo cancellation on the first audio data to generate the second audio data.

8. The device of claim 1, further comprising a light element, and wherein the non-transitory computer-readable media is further configured with instructions that, when executed by the one or more processors, cause the device to perform operations comprising:
causing the light element to emit first light based at least in part on determining, utilizing the first speech recognition component, that the second audio data represents the first wake word; and
causing the light element to emit second light based at least in part on determining, utilizing the second speech recognition component, that the second audio data represents the second wake word.

9. The device of claim 1, further comprising a light element, and wherein the non-transitory computer-readable media is further configured with instructions that, when executed by the one or more processors, cause the device to perform operations comprising causing the light element to emit light based at least in part on at least one of:
determining, utilizing the first speech recognition component, that the second audio data represents the first wake word; or
determining, utilizing the second speech recognition component, that the second audio data represents the second wake word.

10. The device of claim 1, wherein the non-transitory computer-readable media is further configured with instructions that, when executed by the one or more processors, cause the device to perform operations comprising selecting the first speech recognition component to associate with sending the second audio data based at least in part on detecting the first wake word.

11. A method comprising:
receiving audio at a microphone;
generating first audio data representing a processed instance of an audio signal corresponding to the audio;
generating second audio data as a result of digital signal processing performed on the first audio data;
causing a first speech recognition component to determine if the second audio data represents a first wake word;
causing a second speech recognition component to determine if the second audio data represents a second wake word, the first speech recognition component differing from the second speech recognition component; and
sending the second audio data to a remote speech processing system based at least in part on the first speech recognition component determining that the second audio data represents the first wake word.

12. The method of claim 11, wherein generating the second audio data includes performing microphone calibration on the first audio data.

13. The method of claim 12, wherein generating the second audio data includes performing beamforming on the first audio data.

14. The method of claim 12, wherein further comprising performing acoustic echo cancellation on the second audio data.

15. The method of claim 11, wherein:
generating the second audio data includes:
- generating first processed audio data utilizing a first digital signal processing component associated with the first speech recognition component; and
- generating second processed audio data utilizing a second digital signal processing component associated with the second speech recognition component;

the first speech recognition component utilizes the first processed audio data to identify the first wake word; and the second speech recognition component utilizes the second processed audio data to identify the second wake word.

16. The method of claim 15, wherein the first digital signal processing component performs beamforming on the first audio data to generate the second audio data.

17. The method of claim 15, wherein the first digital signal processing component performs acoustic echo cancellation on the first audio data to generate the second audio data.

18. The method of claim 11, further comprising:
- causing a light element to emit first light based at least in part on determining, utilizing the first speech recognition component, that the second audio data represents the first wake word; and
- causing the light element to emit second light based at least in part on determining, utilizing the second speech recognition component, that the second audio data represents the second wake word.

19. The method of claim 11, further comprising causing a light element to emit light based at least in part on at least one of:
- determining, utilizing the first speech recognition component, that the second audio data represents the first wake word; or
- determining, utilizing the second speech recognition component, that the second audio data represents the second wake word.

20. The method of claim 11, further comprising selecting the first speech recognition component to associate with sending the second audio data based at least in part on detecting the first wake word.

\* \* \* \* \*